United States Patent [19]

Melichar

[11] Patent Number: 5,453,334
[45] Date of Patent: Sep. 26, 1995

[54] AUTOMATIC BATTERY WATERING SYSTEM

[75] Inventor: Robert J. Melichar, Dearborn, Mich.

[73] Assignee: Ford Motor Company, Dearborn, Mich.

[21] Appl. No.: 369,636

[22] Filed: Jan. 6, 1995

[51] Int. Cl.[6] .................................................... H01M 2/36
[52] U.S. Cl. ............................. 429/64; 429/50; 429/74; 429/91; 137/260
[58] Field of Search ........................ 429/61–64, 50–52, 429/72–74, 80, 91.90; 137/260

[56] References Cited

U.S. PATENT DOCUMENTS

| | | | |
|---|---|---|---|
| 2,141,079 | 12/1938 | Bolich | 429/64 |
| 3,189,063 | 8/1962 | Lowe . | |
| 3,871,923 | 3/1975 | Ikeda . | |
| 4,353,968 | 10/1982 | Boyle | 429/64 |
| 4,399,200 | 8/1983 | Galloway . | |
| 4,522,896 | 6/1985 | Iseard | 429/63 |
| 4,751,156 | 6/1988 | Olimpio | 429/64 |
| 4,754,777 | 7/1988 | Frode . | |
| 5,135,820 | 8/1992 | Jones . | |
| 5,284,176 | 2/1994 | Campau | 137/260 |

*Primary Examiner*—Anthony Skapars
*Attorney, Agent, or Firm*—D. Porcari; Roger L. May

[57] ABSTRACT

A battery watering (8) system using a plurality of cells (14) and modules (12). Watering ramps (11) communicate water from a reservoir (18) to a series of interconnected watering caps (16). A reversible pump (30) is positioned below the watering caps (16) such that water within the watering caps (16) and interconnecting conduits (26, 28) drains through the pump (30) and into the reservoir (18) by syphon when no voltage is applied to the pump (30). A controller (39) automatically operates the watering system (8) by sensing the amp hours used since the last watering and determines whether or not the battery needs water. Successful battery watering or system failure are signaled (40) to the operator.

7 Claims, 7 Drawing Sheets

AUTOMATIC BATTERY WATERING SYSTEM

BACKGROUND OF THE INVENTION

1. Field of the Invention

The present invention relates to an automatic watering system for batteries. More specifically, the invention relates to a watering system having a gravity syphon to drain excess water from the battery through a reversible pump and a method for automatically operating the watering system.

2. Description of the Related Art

High power and high voltage batteries are useful in commercial and industrial applications. One application requiring a high voltage and high powered battery is electric vehicles. Several types of electric vehicle batteries require periodic replenishment of electrolyte, including lead acid, nickel cadmium and nickel metal hydride. Recharging the battery causes an electrolysis of the water and results in the evolution of gas. Water is added to the battery cells to maintain an equilibrium of the electrolyte and to completely wet the cell surfaces.

A number of battery watering systems are known in the prior art. Typical of the known automatic watering systems for batteries is U.S. Pat. No. 4,522,896, issued Jun. 11, 1985 to Isard. Isard teaches a battery having a series of connected cells. Each cell has an associated watering cap and an interconnecting means receiving electrolyte from a reservoir. The interconnecting means, reservoir and caps form an essentially closed system. The reservoir selectively communicates with a watering pump, watering cap and flame trap. The interconnecting means also includes a gas purging means to selectively open the closed system to the atmosphere. Gas is selectively purged from within the system during the operation of a gas purging cycle.

Isard requires either a combination liquid/gas type pump such as a diaphragm or peristaltic type pump or the use of a separate air pump to force air through the interconnecting means. Isard does not teach an automatic watering system to alert the operator to a low water condition, operate the pumps and valves to water the battery to the appropriate fill level and detect a fault condition.

U.S. Pat. No. 4,399,200, issued Aug. 16, 1983 to Galloway, teaches a method for controlling a pump in a storage battery. Galloway teaches applying of variable electric voltage to the pump motor to control the flow rate into the battery. This invention is primarily intended for halogen hydride type electric storage batteries and does not detect low electrolyte levels within the battery nor automatically watering each cell in a battery.

The present invention overcomes the deficiencies of the prior art by using a low cost reversible pump to provide water to a battery. The watering caps and conduit are purged of excess water through a gravity syphon. A controller senses water usage to detect proper system operation and disables the charging system to prevent battery damage due to a lapse in watering maintenance.

SUMMARY OF THE INVENTION

The present invention provides a battery watering system for a battery having a plurality of cells connected in series. A watering cap associated with each cell receives water from a reservoir through a first watering conduit. A reversible pump communicates water from the reservoir through the first watering conduit. A second watering conduit communicates flow through water from the watering caps back to the reservoir. The pump is positioned below the watering caps such that water within the watering caps and the second watering conduit drains through the pump by syphon when no voltage is applied to the pump.

The invention may be used with a large electric vehicle battery made up of a series of interconnected modules. A watering ramp provides water to one or more modules. Each watering ramp has its own reservoir, pump and watering conduits. The battery modules are usually electrically connected in series to provide a high voltage. The watering ramps are only exposed to the voltage of their associated modules and are not exposed to the total battery voltage.

The vehicle controller may be optionally used to control the operation of the watering system. The controller senses the amp hours used since the last watering and determines if the battery needs water. The controller operates the pump and related components to provide water to the battery. After every cell is filled, the controller shuts power to the pump. Water within the watering caps and watering conduits drains through the reversible pump by a gravity syphon.

The system provides for the automatic watering of separate watering ramps so that no portion of the watering system is exposed to the total battery voltage. The watering system signals an operator of successful battery watering or system failure. Low cost reversible pumps permit water to drain from the watering system by gravity syphon and thus eliminate the need for costly sealing pumps or separate air pumps. These and other benefits of the present invention will be more apparent from the following description of the preferred embodiments.

DETAILED DESCRIPTION OF THE PREFERRED EMBODIMENTS

Figure 1:
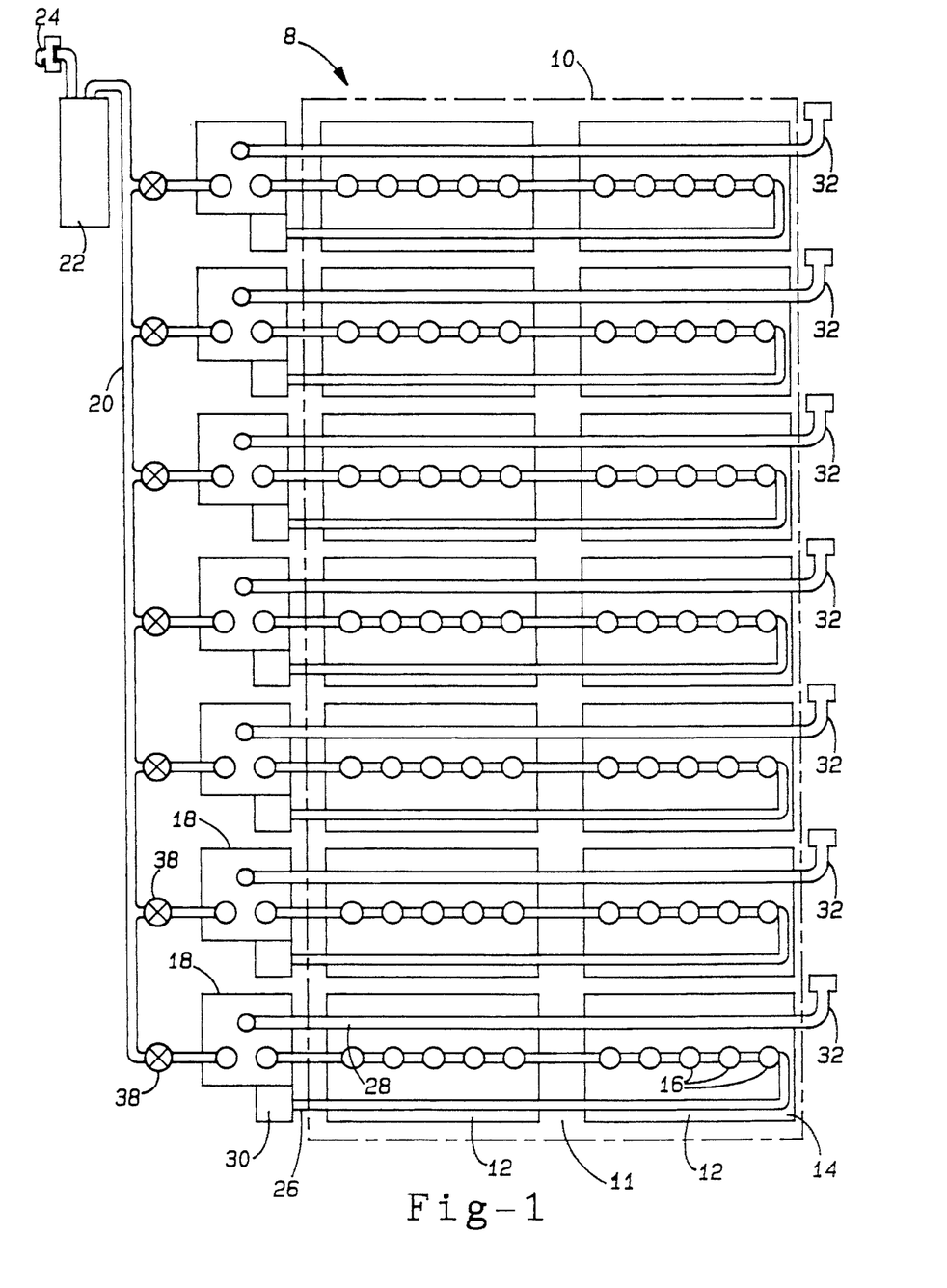
FIG. 1 is a pictorial block schematic of an automatic watering system of the present invention showing the relative elevational disposition of the components.

An embodiment of the invention is illustrated in FIG. 1. Automatic battery watering system 8 provides water on an 'as needed' basis to battery 10. Battery 10 is arranged to include 7 separate watering ramps 11. Each watering ramp 11 includes two modules 12 connected in series. Each module 12 contains a series of interconnected cells 14. Each cell 14 has an associated watering cap 16 that provides water to the cell and vents gas evolution from the cell. Each watering ramp 11 is associated with a reservoir 18. The invention is primarily intended for use with high voltage and high powered batteries which are typically used in electric vehicle applications. To reduce the electrical hazards of watering this type of battery, the watering system is designed so that no portion of watering system 8 is exposed to the total battery voltage.

Reservoir 18 is a generally vertical container receiving deionized water from watering manifold 20. Deionizer 22 receives tap water hose 24 and removes unwanted ions. Reservoir 18 is connected to ramp 11 through fill/drain conduit 26 and overflow conduit 28. Conduit 26 provides water to cell cap 16 and drains unused water within the cell caps and conduit to reservoir 18. When cells 14 are fully watered, excess water flows through cell caps 16 and returns to reservoir 18 through conduit 28. After cell watering is completed, power to pump 30 is removed and water within cell caps 16 and conduit 28 drains into reservoir 18 by a gravity syphon through conduit 26.

Reversible pump 30 operates in a manner to pump water through conduit 26 and cell caps 16 when power is applied to the pump motor (pump motor not separately shown). When power is removed from the pump, pump 30 permits the reverse flow of water into the reservoir. Pump 30 does not operate in a reverse mode. Pump 30 need only permit the reverse flow of water through the pump by syphon. Representative reversible pumps include centrifugal, propeller, or turbine type pumps. Sealing type pumps such as diaphragms, peristalic and piston pumps do not generally permit a reverse flow of water through the pump and are therefore not suitable for the present invention.

Reservoir 18, conduit 28 and watering caps 16 are continuously vented through combustible vapor vent 32. Isolation of the ramps during venting limits the loss of modules to that ramp in the event of ignition. Reservoir 18 may be located immediately adjacent or attached to battery 12 or at a location remote from battery 12. Reservoir 18 is positioned below the height of cell caps 16 to drain water within cell caps 16 and conduits 26, 28 by gravity syphon. The cell caps and conduit should be drained of water to prevent current flow through the watering conduits and to alleviate the problem of water freezing within the conduits and cell caps. Reservoir 18, manifold 20 and conduits 26, 28 are usually insulated or optionally heated to prevent freezing. The invention provides for an open system that permits the continuous exhaust of vapors generated during the battery operation or charging. As will be more fully described below, valve 38 operates to replenish reservoir 18 with deionized water.

Figure 2:
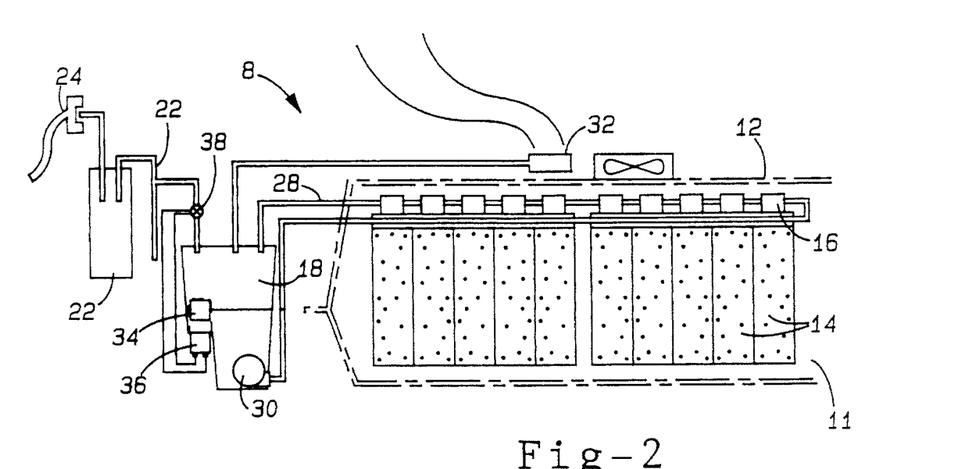
FIG. 2 is a side view of the watering system illustrating a gassing condition of the battery.

FIGS. 2-5 generally illustrate the operation of the battery before, during and after cell watering. FIG. 2 illustrates a gassing condition occurring during cell overcharge. Nickel based batteries generally require overcharge to bring the nickel electrode up to 100% of electron capacity. Overcharge of the battery occurs when energy applied to the battery during charging converts water in the electrolyte to gas through electrolysis. The negative electrode (cadmium or hydride) is generally fully charged before the positive electrode (nickel). The charging energy necessary to bring the nickel electrode to 100 percent of capacity is generally between 15 and 20 percent of the total energy used in recharging and results in gas generation. Gas exit cells 14 through watering caps 16 and is vented through conduit 28 and vent 32. After sufficient time passes so that the positive electrode is totally restored to 100 percent of capacity, the system initiates the watering process.

Figure 3:
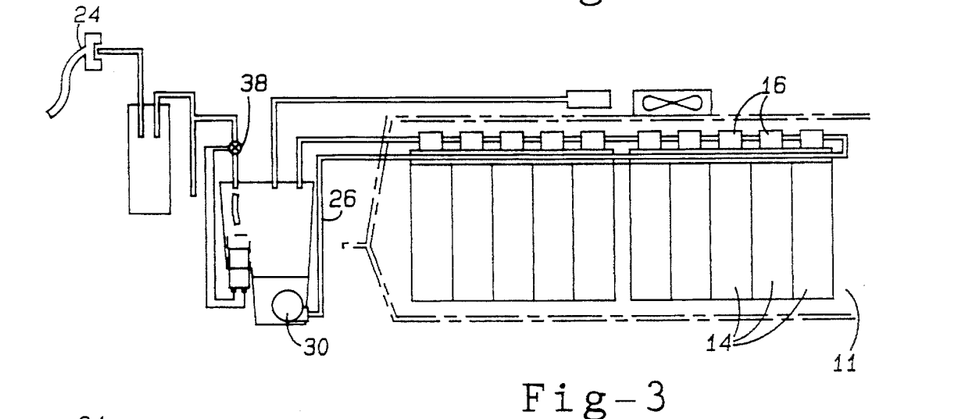
FIG. 3 is a side view of the watering system illustrating cell watering.
Figure 4:
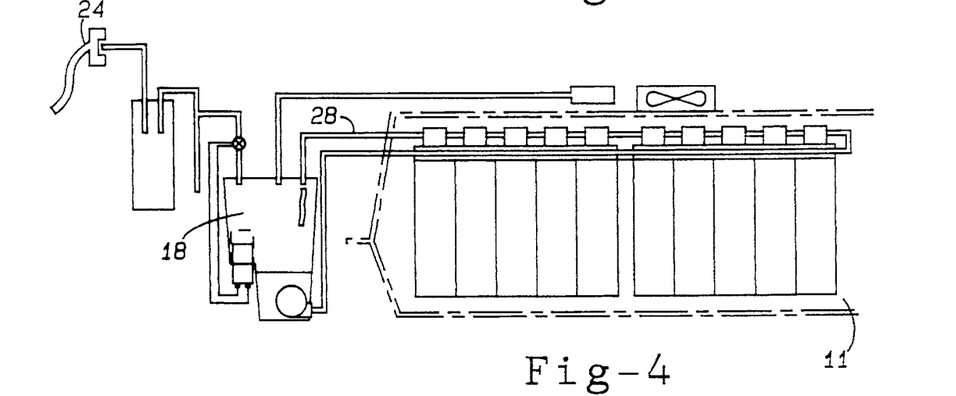
FIG. 4 is a side view of the watering system illustrating watering flow-through of the cells.
Figure 5:
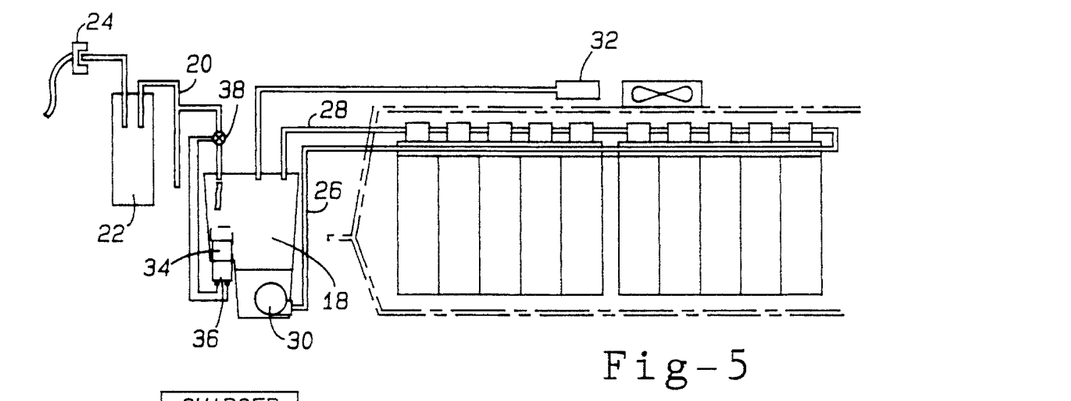
FIG. 5 is a side view of the watering system illustrating syphon evacuation of the cell caps.

FIG. 3 illustrates cell watering. At the completion of overcharge, power is applied to pump 30. Pump 30 supplies water to watering caps 16 to fill cells 14. After each individual cell 14 is filled to capacity, the overflow travels through conduit 28 into reservoir 18. A period of overflow assures that each cell is completely replenished with water as shown in FIG. 4. After the flow through period, power is removed from pump 30 as shown in FIG. 5. Water within conduits 26, 28 drains through pump 30 and into reservoir 18 by a gravity siphon. Pump 30 need not be hydraulically reversible, it need only permit the reverse flow of fluid through the pump. Float 34 senses the water level within reservoir 18 and closes reed switch 36 when the water level drops below a predefined threshold. Switch 36 causes solenoid valve 38 to open and admit pressurized deionized water into reservoir 18. As the water level in reservoir 18 rises, float 34 causes switch 36 to close valve 38 after reservoir 18 is filled sufficiently. Gas within reservoir 18 is displaced by the replenishing water and is exhausted through vent 32.

Figure 6:
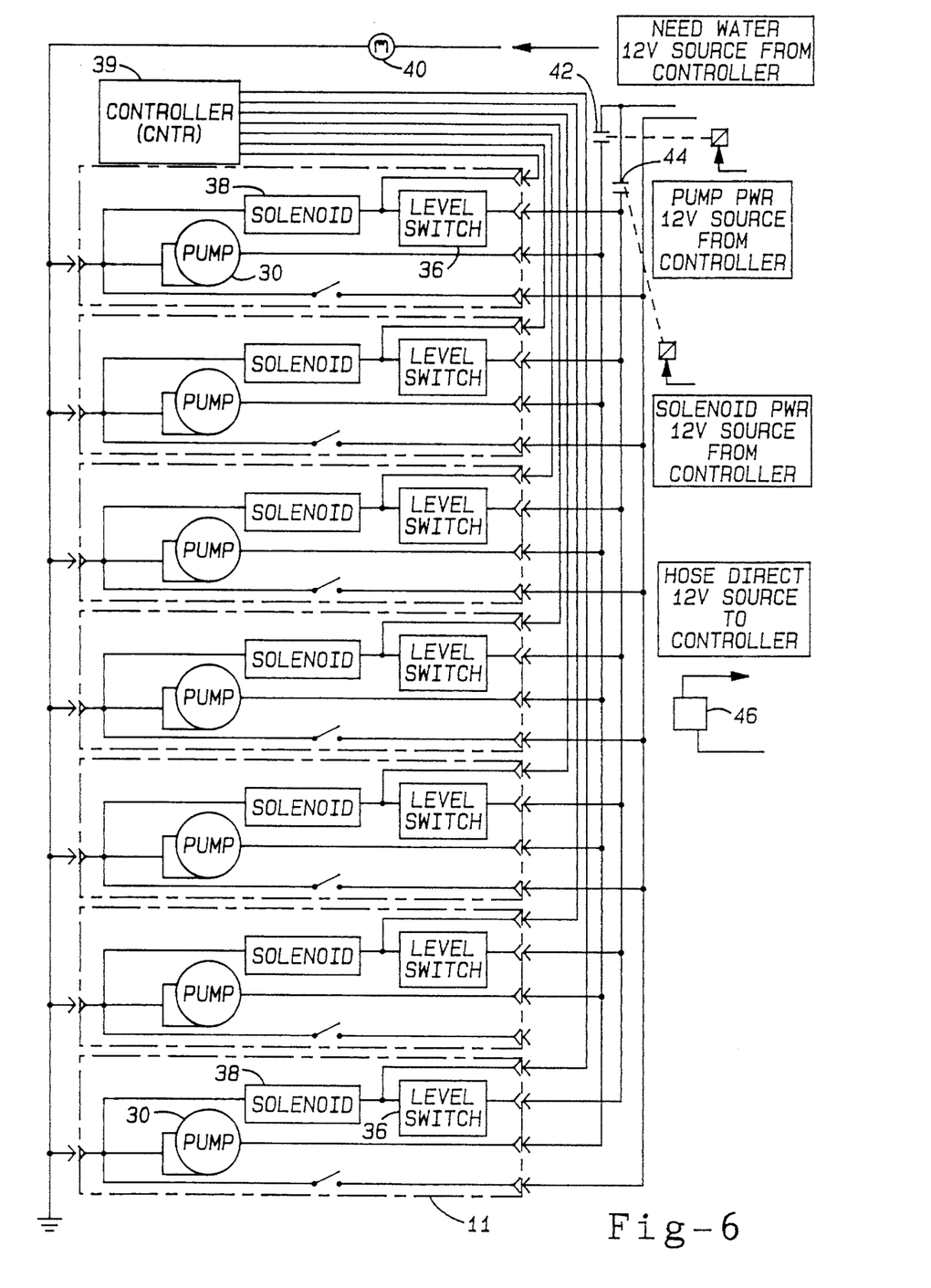
FIG. 6 is an electrical schematic of the watering system.

Electrical schematic of FIG. 6 illustrates the circuitry used by battery watering system 8. Controller 39 (CNTR) is a microprocessor that operates the various electrical components of watering system 8. Controller 39 may be used solely for purposes of the watering system or alternatively it may be a general purpose microprocessor used in the operation of the vehicle or the vehicle charging system. Indicator light 40, mounted in the vicinity of the charger connection, signals that the battery cells need water. Relay contacts 42, 44 provide power to pumps 30 and solenoid valves 38 respectively. Hose detection circuit 46 signals if watering hose 24 is connected to deionizer 22.

Figure 7:
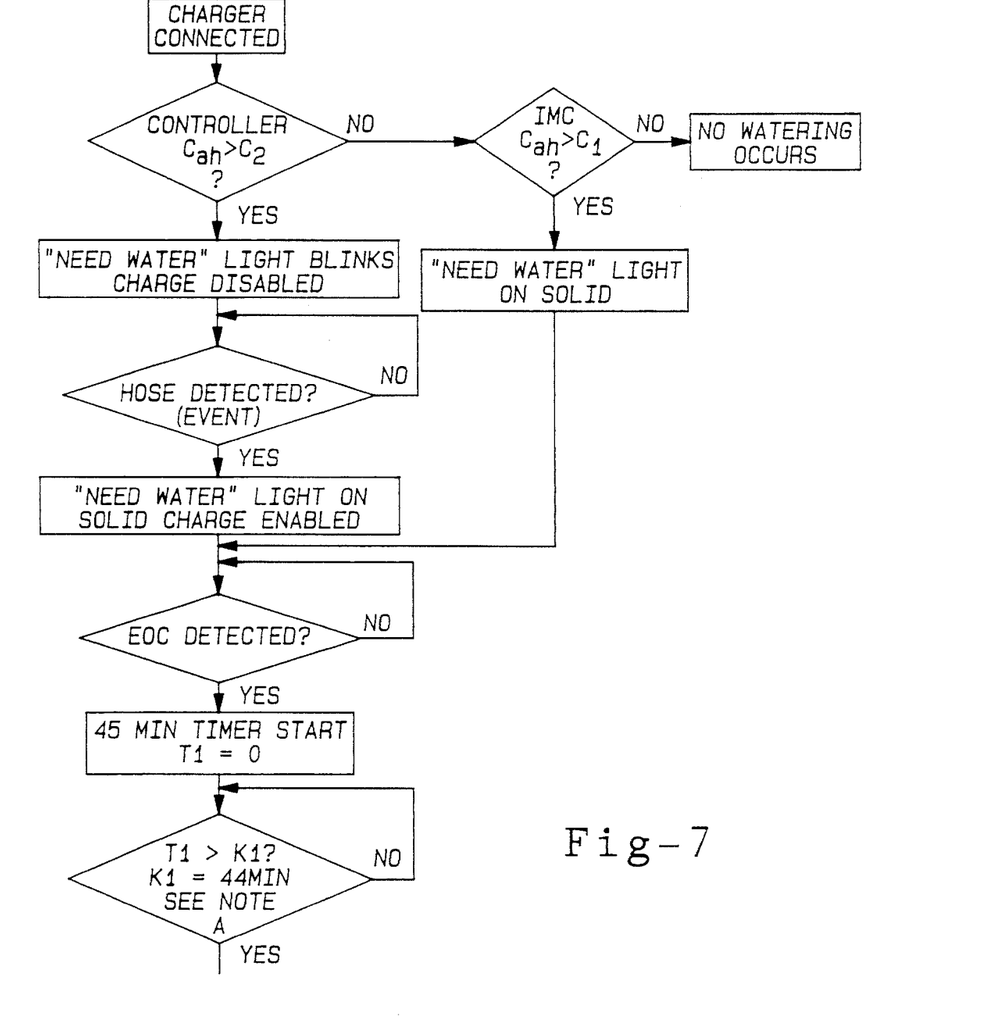
FIGS. 7–9 are flow charts illustrating the operation of the watering system.
Figure 8:
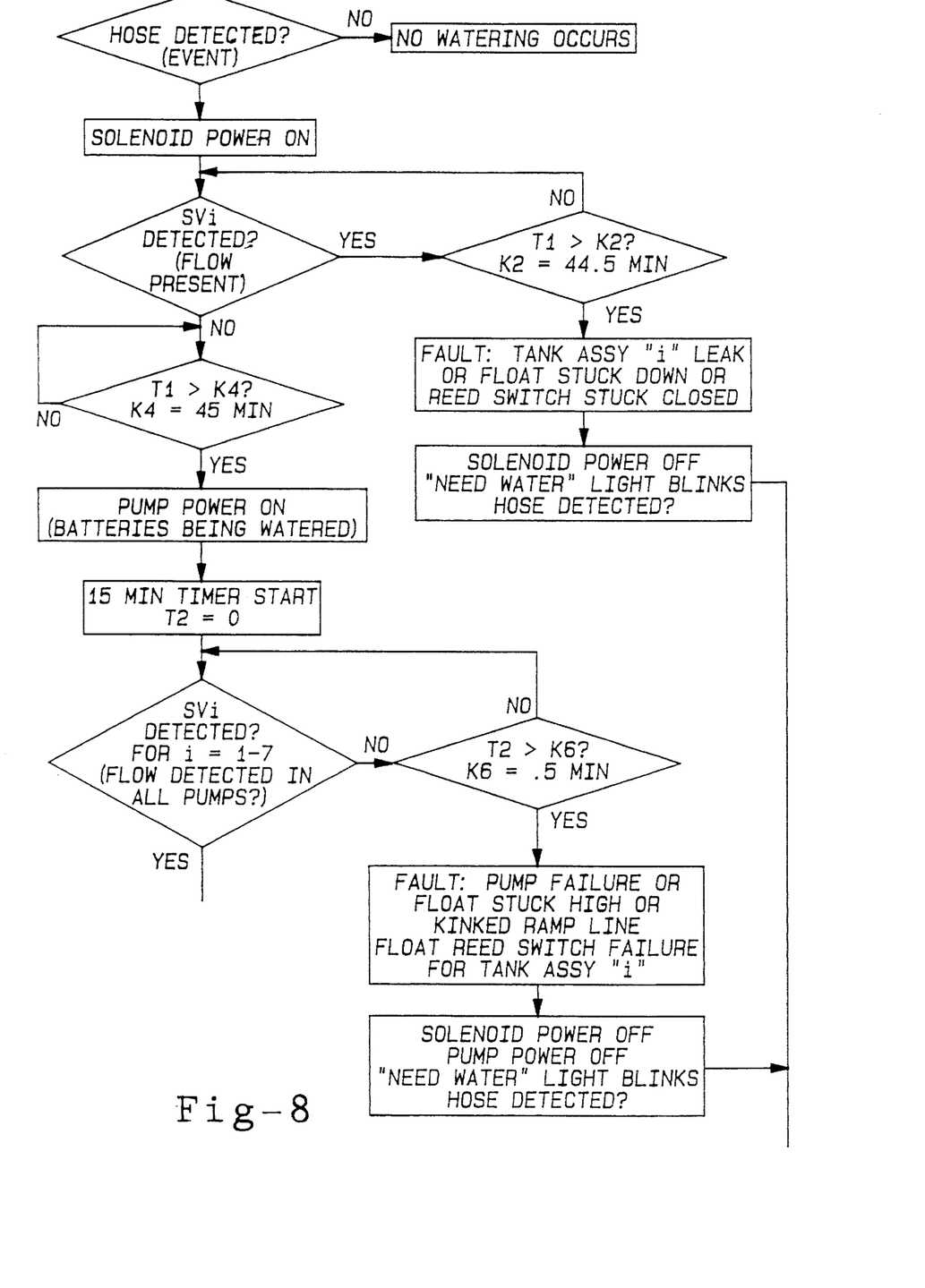
Figure 9:
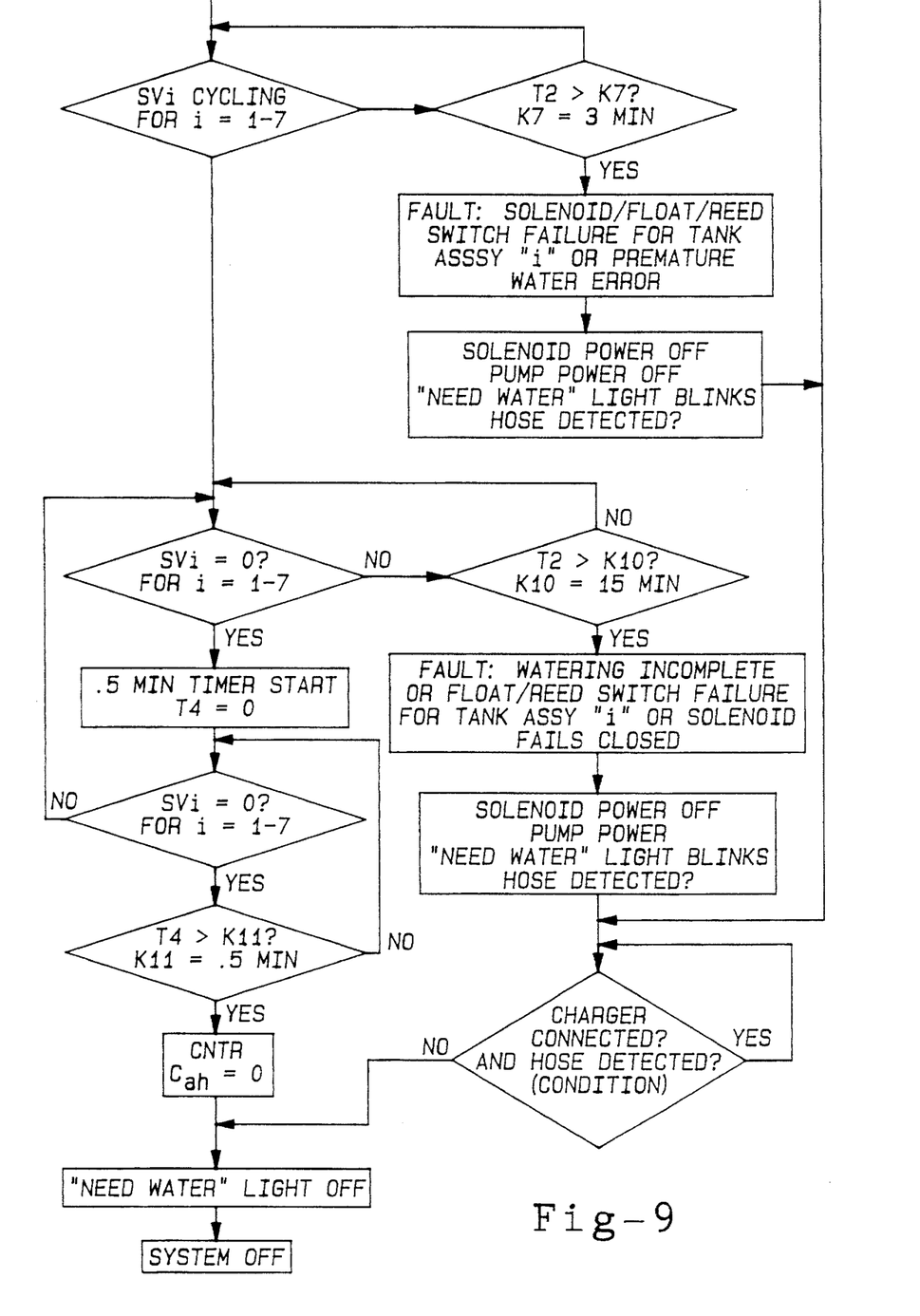

The control parameters for watering system 8 are illustrated in FIGS. 7-9. Beginning in FIG. 7, an external electrical source attaches to the vehicle charger. Controller 39 senses the total amount of amp-hours passing through battery 10 during overcharge ($C_{ah}$). If $C_{ah}$ is greater than constant $C_2$, then the amount of overcharge that has occurred in battery 10 has probably electrolyzed sufficient water to require the replenishment of watering system 8 from an external water source. If $C_{ah}$ is greater than $C_1$, then cell watering may occur. Pressurized water is available to reservoir 18 and supplies water to cells Controller 39 monitors $C_{ah}$ and causes light 40 to alert the operator to the need for water ("Need Water" light 40 on). If $C_{ah}$ is less than $C_1$, the amount of overcharge has likely not caused a great deal of electrolyte electrolysis and therefore no watering need occur. When $C_{ah}$ is greater than $C_2$, the charger is disabled unless hose 24 is connected to deionizer 22. The battery is charged until an end of charge (EOC) is detected. Controller 39 then begins a first timer $T_1$ which is a function of the evolution of gas from the recently overcharged battery and the cell cap configuration. Typical times are about 44 minutes.

Figure 10:
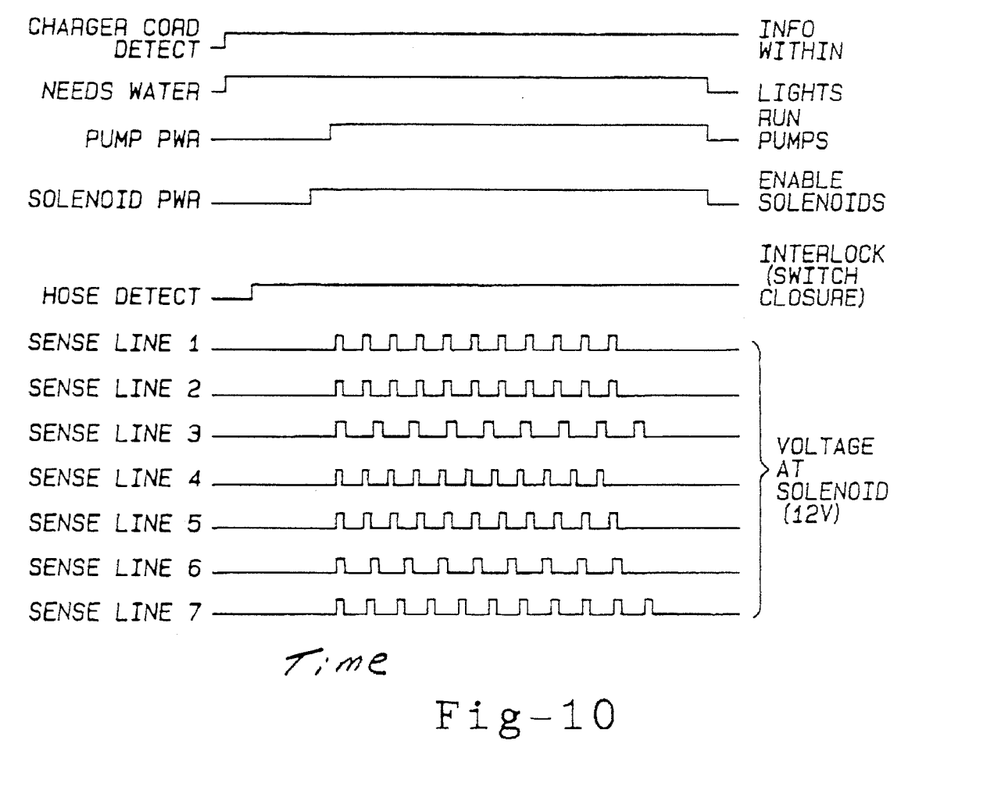
FIG. 10 is a timing diagram of the watering system during and after cell watering.

Moving to FIG. 8, power is supplied to the solenoid valve 38/switch 36 couple. If the level of float 34 senses that reservoir 18 needs water, then switch 36 causes valve 38 to open and admit water to reservoir 18. After reservoir 18 is filled, switch 36 causes valve 38 to close. Each opening and closing appears as a voltage pulse. Controller 39 records these pulses in a memory. As cells 14 fill with water, the water within reservoir 18 causes float 34 to drop and to open valve 38. The repeated opening and closing of valve 38 produces a cycling pattern as illustrated in FIG. 10. Five on/off cycles are usually sufficient to assume the system is working properly.

Controller 39 senses the solenoid voltage (SV) for each watering ramp i (Sense line). If any line i fails to record 5 pulses (SVs), then controller 39 records a failure event and displays a fault ("Need Water" light 40 blinks). Controller 39 can also monitor the pump power (Pump Pwr), solenoid power (Solenoid Pwr), hose detect or charger cord detect (Charger Cord Det) to precisely determine the location of various faults. While a single continuous or blinking light 40 has been used to display the condition of the watering system, other more detailed display means are also possible.

After the solenoids stop cycling on and off, controller 39 senses that cells 14 are completely filled. After a sufficient period of time has elapsed for flow through (usually 30 seconds), controller 39 removes power from valve 38/switch 36 and pump 30 and resets $C_{ah}$ to 0. If controller 39 has not record any component failures (the presence of 5 or more SVs for each watering ramp or other system fault), then light 40 is turned off. This signals the operator that the watering system has functioned properly and the cells are filled.

The foregoing description is a preferred exemplary embodiment of the present invention. The invention is not limited to the specific form shown. Modifications may be made in the design, arrangement, circuitry or functioning of the individual components and operating steps without departing from the spirit of the invention as expressed in the following claims.

I claim:

1. A battery watering system comprising:
   a battery having a plurality of cells connected in series;
   a watering cap associated with each said cell;
   a reservoir communicating water from said watering caps through a first watering conduit; and
   a reversible pump communicating water from said reservoir to a second watering conduit, and said second watering conduit communicating water to said watering caps, said pump being positioned below said watering caps whereby water within said watering caps and said second watering conduit drains through said pump by siphon.

2. The battery watering system of claim 1 and further comprising a controller sensing the need for cell watering and operating said pump to provide water to said cell.

3. The battery watering system of claim 2 and further comprising a water level sensor sensing the water level within said reservoir and causing a valve to admit water into said reservoir when the water within said reservoir is low.

4. The battery watering system of claim 3, wherein said controller records the operation of said valve and signals an operator in the event said battery watering system fails.

5. The battery watering system of claim 1 wherein said battery comprises a plurality of watering ramps, each said watering ramp supplies water to one or more modules, said module comprising a plurality of said cells; each said watering ramp being associated with one said reservoir, each said watering ramp being electrically isolated from the other said watering ramps.

6. A battery watering system comprising:
   a battery having a plurality of modules connected in series, each said module having a plurality of cells connected in series;
   a watering cap associated with each said cell;
   one or more watering ramps providing water to said modules;
   a reservoir associated with each said watering ramp communicating water from said watering caps through a first watering conduit;
   a valve associated with each said watering ramp operable to admit deionized water into said reservoir;
   a water level sensor sensing the water level within each said reservoir and causing said valve to open and admit water into said reservoir when the water within said reservoir is low;
   a reversible pump associated with each said watering ramp communicating water from said reservoir to a second watering conduit, said second watering conduit communicating water to said watering caps of said module, said pump being positioned below said watering caps whereby water within said watering caps and said second watering conduit drains through said pump by siphon; and
   a controller sensing the need for cell watering and operating said pump to provide water to said cells, said controller recording the operation of said valve to determine the normal operation of said watering system and signaling an operator of successful and unsuccessful battery watering.

7. A method of watering a battery comprising the steps of:
   charging said battery and recording the amp hours of overcharge;
   signally a "need water" alert to an operator if said overcharge amp hours exceeds an amount;
   sensing the connection of a pressurized water source to a water inlet and preventing battery charging in the event said connection is absent;
   operating a pump to provide water to said cells;
   operating a valve to admit water into a reservoir and recording the operation of said valve;
   signaling a "failure" alert to said operator if said valve or pump fail to operate properly; and
   signalling a successful battery watering if said watering system operates properly.

* * * * *